(12) United States Patent
Zhou et al.

(10) Patent No.: US 8,650,196 B1
(45) Date of Patent: Feb. 11, 2014

(54) CLUSTERING DOCUMENTS BASED ON COMMON DOCUMENT SELECTIONS

(75) Inventors: Yun Zhou, San Jose, CA (US); Anna Dagna Majkowska, San Francisco, CA (US)

(73) Assignee: Google Inc., Mountain View, CA (US)

( * ) Notice: Subject to any disclaimer, the term of this patent is extended or adjusted under 35 U.S.C. 154(b) by 76 days.

(21) Appl. No.: 13/251,056

(22) Filed: Sep. 30, 2011

(51) Int. Cl.
*G06F 7/00* (2006.01)
(52) U.S. Cl.
USPC .......................................... 707/737; 707/749
(58) Field of Classification Search
USPC .................................... 707/737, 749
See application file for complete search history.

(56) References Cited

U.S. PATENT DOCUMENTS

| | | | |
|---|---|---|---|
| 5,442,778 A * | 8/1995 | Pedersen et al. | 1/1 |
| 2004/0093321 A1* | 5/2004 | Roustant et al. | 707/3 |
| 2005/0015366 A1* | 1/2005 | Carrasco et al. | 707/3 |
| 2005/0144158 A1* | 6/2005 | Capper et al. | 707/3 |
| 2007/0255702 A1* | 11/2007 | Orme | 707/5 |
| 2008/0263022 A1* | 10/2008 | Kostorizos et al. | 707/5 |
| 2009/0287668 A1* | 11/2009 | Evans et al. | 707/4 |
| 2012/0290575 A1* | 11/2012 | Hu et al. | 707/737 |

* cited by examiner

*Primary Examiner* — Cheyne D Ly
(74) *Attorney, Agent, or Firm* — Harrity & Harrity, LLP

(57) ABSTRACT

One or more server devices may receive first navigation information identifying a first set of documents that are selected after a first document is presented and second navigation information identifying a second set of documents that are selected after a second document is presented; compare the first set of documents to the second set of documents; generate a similarity score based on the comparing; determine based on the similarity score, that the first document is similar to the second document; and generate, based on determining that the first document is similar to the second document, a cluster that includes identification information identifying the first document and the second document.

18 Claims, 9 Drawing Sheets

CLUSTERING DOCUMENTS BASED ON COMMON DOCUMENT SELECTIONS

BACKGROUND

Many techniques are available to users today to find information on the World Wide Web ("web"). For example, users often use web browsers and/or search engines to find information of interest. In order to provide quality results to users, search engines often cluster information regarding search result documents, such as web pages, images, audio files, videos, etc., together.

SUMMARY

According to one possible implementation, a method may include receiving first navigation information identifying a first set of documents that are selected after a first document is presented. The method may further include receiving second navigation information identifying a second set of documents that are selected after a second document is presented. The method may also include comparing the first set of documents to the second set of documents. Further still, the method may include generating a similarity score based on the comparing. Additionally, the method may include determining, based on the similarity score, that the first document is similar to the second document. The method may further include generating, based on determining that the first document is similar to the second document, a cluster that includes identification information identifying the first document and the second document.

According to another possible implementation, a system may include one or more memory devices storing instructions. The system may also include one or more processors to execute the instructions to receive first navigation information identifying a first set of documents that are selected after a first document is presented. The first navigation information may further identify a quantity of times each document, in the first set of documents, was selected after the first document was presented. The one or more processors may further receive second navigation information identifying a second set of documents that are selected after a second document is presented. The second navigation information may further identify a quantity of times each document, in the second set of documents, was selected after the second document was presented. Additionally, the one or more processors may compare the first set of documents to the second set of documents. When comparing the first set of documents to the second set of documents, the one or more processors may generate a similarity score based on the comparing, where the similarity score is further based on at least one of the quantities of times each document, in the first set of documents, was selected after the first document was presented, or the quantities of times each document, in the second set of documents, was selected after the second document was presented. The one or more processors may also determine, based on the similarity score, that the first document is similar to the second document. Furthermore, the one or more processors may generate, based on determining that the first document is similar to the second document, a cluster that includes correlation information identifying the first document and the second document.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

Overview

Search engines often employ document clustering for several purposes. For example, documents, such as web pages, images, videos, etc., may be clustered according to topics. Thus, a "cluster," as referred to herein, may include information regarding a group of documents that have been identified as topically similar. Each cluster may be associated with one or more labels that serve to identify the topic(s) associated with the cluster. When a user provides a search query to a search engine, the search engine may use cluster information when returning search results to the user.

For instance, if a user enters a search query, "Lotus," the search engine may provide information regarding, e.g., links to, search result documents, such as images, web pages, videos, audio files, etc., that the search engine identifies as relevant to the term "Lotus." For example, the search result documents may include information associated with images of Lotus brand automobiles, e.g., links to the images, documents that include the images, the images themselves, etc., and information associated with images of lotus flowers, e.g., links to the images, documents that include the images, the images themselves, etc.

A system and/or method, described herein, may enable a search engine to identify and cluster documents that are similar, based on selections made by a user, e.g., documents relating to Lotus brand automobiles may be associated with one cluster, while documents relating to lotus flowers may be associated with another cluster. For example, if users commonly select images of lotus flowers after a particular image of a lotus flower is presented, e.g., accessed, selected, included in a list of search results, etc., then the selected images and the particular image may be clustered together.

The concepts described herein may be applied to sets of documents. In one implementation, the documents may be images, such as images indexed by an image search engine. More generally, a document may be broadly interpreted to include any machine-readable and machine-storable work product. A document may include, for example, an e-mail, a web site, a file, a combination of files, one or more files with embedded links to other files, a news group posting, a news article, a blog, a business listing, an electronic version of printed text, a web advertisement, etc. In the context of the Internet, a common document is a web page. Documents often include textual information and may include embedded information, such as meta information, images, hyperlinks, etc., and/or embedded instructions, such as Javascript, etc. A "link," as the term is used herein, is to be broadly interpreted to include any reference to/from a document from/to another document or another part of the same document.

Figure 1:
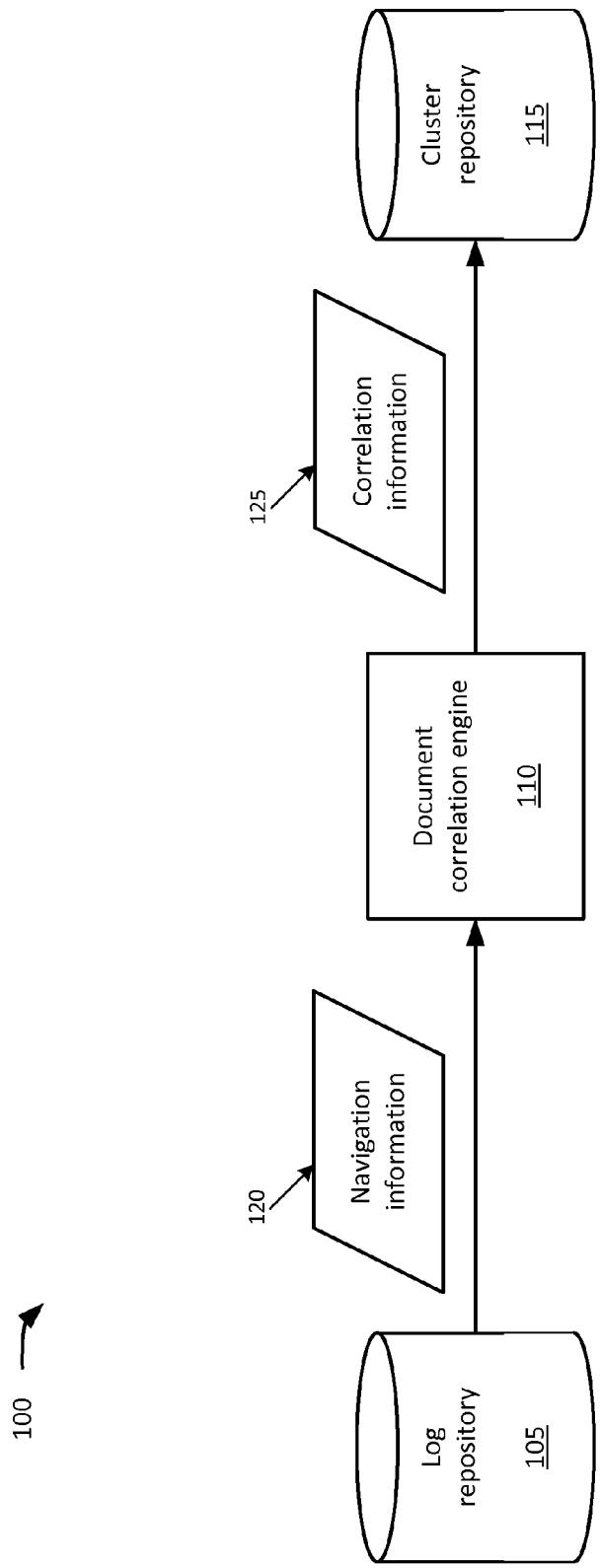
FIG. 1 illustrates an overview of an example implementation described herein.

FIG. 1 illustrates an example system 100 in which systems and/or methods described herein may be implemented. System 100 may include log repository 105, document correlation engine 110, and cluster repository 115. While certain components have been shown in the example illustrated in FIG. 1, in practice, there may be additional, fewer, and/or different components. As illustrated in FIG. 1, log repository 105 may provide navigation information 120 (described in further detail below with respect to FIG. 5) to document correlation engine 110. Navigation information 120 may include logged information that describes past behavior, e.g., navigation, of users. Navigation information 120 may identify documents that were presented as search results, documents that were selected after other documents were presented. Navigation information 120 may identify further details regarding the documents that were selected after other documents were presented, such as how many times the documents were selected, how long after a document was presented that another document was selected, etc. In some implementations, navigation information is anonymized.

Document correlation engine 110 may generate correlation information 125 (described in further detail below with respect to FIG. 6) based on navigation information 120. In order to generate correlation information 125, document correlation engine 110 may analyze some or all of navigation information 120 to identify documents that have similar sets of subsequently selected documents. Additionally, or alternatively, document correlation engine 110 may identify sets of documents in which at least one of the documents has been selected after another document, in the set of documents, has been presented. Document correlation engine 110 may provide the generated correlation information 125 to cluster repository 115. Cluster repository 115 may store information regarding clusters, e.g., correlation information 125 and/or other information that is based on correlation information 125. Cluster repository 115 may further provide the stored information to a search engine, which may use the information in presenting search results, e.g., clustered search results, to users.

Example Environment

Figure 2:
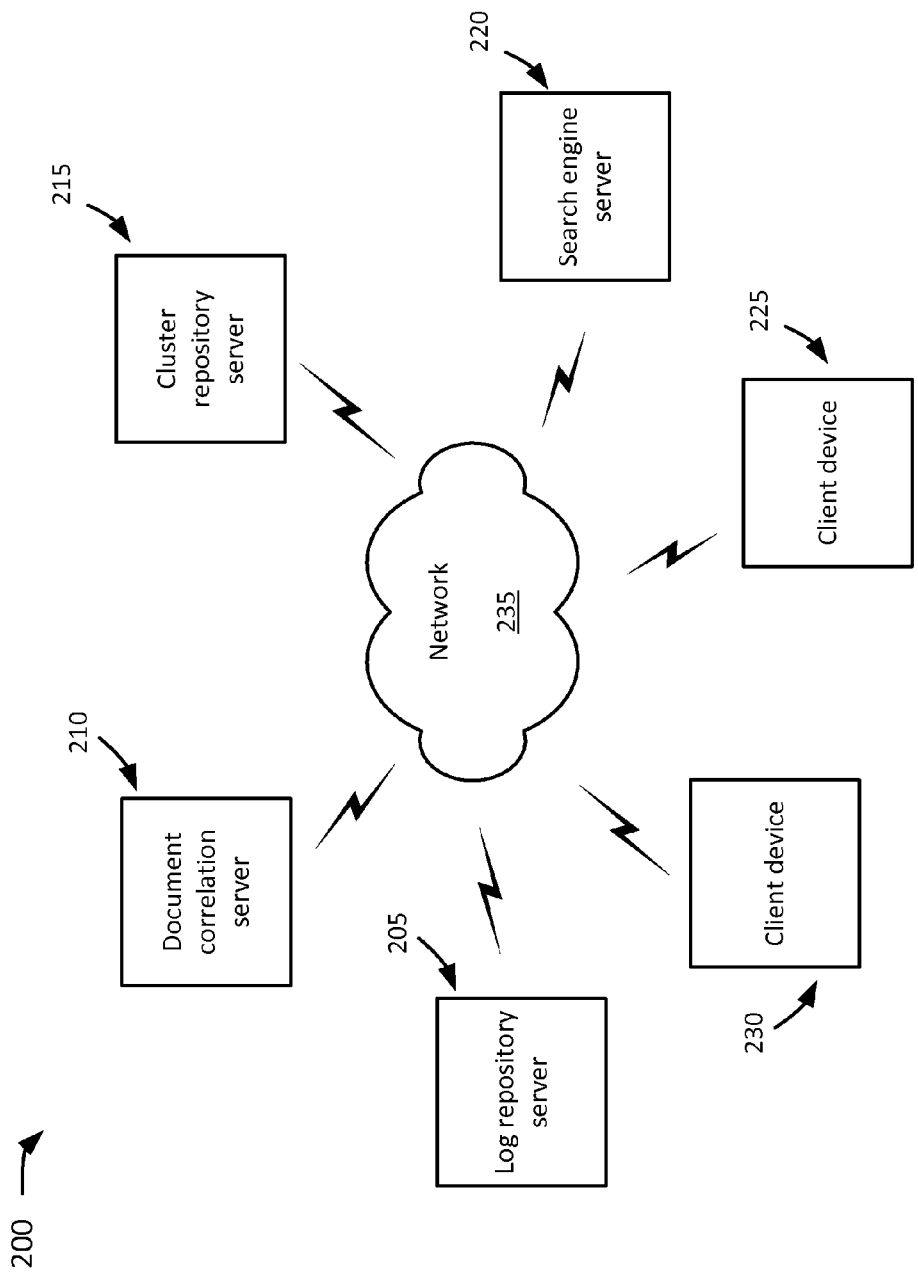
FIG. 2 shows an example environment in which systems and/or methods described herein may be implemented.

FIG. 2 is a diagram of an example environment 200 in which systems and/or methods described herein may be implemented. Environment 200 may include multiple servers 205-220 connected to each other, and to multiple clients 225-230 via a network 235. Four servers 205-220 and two clients 225-230 have been illustrated as connected to network 235 for simplicity. In practice, there may be additional or fewer clients and servers. Also, in some instances, a client may perform a function of a server, and a server may perform a function of a client.

Each server 205-220 may be implemented as a single server device or a collection of server devices that may be co-located or remotely located. Additionally, or alternatively, any two or more of servers 205-220 may be implemented within a single, common server device or a single, common collection of server devices.

Servers 205-220 may include server devices that gather, process, search, and/or implement functions in a manner described herein. One or more of servers 205-220 may perform functions described with respect to one or more components described with respect to FIG. 1. For example, server 205 may implement functionality described above with respect to log repository 105, server 210 may implement functionality described above with respect to document correlation engine 110, and cluster repository server 215 may implement functionality described above with respect to cluster repository 115.

Server 220 may implement a search engine that receives search queries, e.g., from client devices 225-230. Server 220 may interact with one or more of servers 205-215 in order to determine documents as search results, including clusters of search results, responsive to search queries. Server 220 may provide a search result document to a client, e.g., client device 225/230, from which a search query was received. The search result document, provided by server 220, may include information identifying clusters of search results. The search result document may further include information regarding one or more other documents that were identified as responsive to the search query.

Additional servers, implementing other functions, although not explicitly shown, may also be implemented in environment 200. The additional servers may provide, for example, web content, payment services, shopping services, social networking services, etc.

Each of clients 225-230 may include a client device, such as personal computer, a wireless telephone, a personal digital assistant ("PDA"), a laptop, or another type of computation or communication device. Clients 225-230 may include user interfaces presented through one or more browsers, e.g., web browsers, such as Chrome.

While servers 205-220 are shown as separate components, it may be possible for one or more of servers 205-220 to perform one or more of the functions of another one or more of servers 205-220. For example, in one implementation, server 220 may perform the functions of server 210. Additionally, or alternatively, server 220 may perform the functions of one or more of servers 205-215.

Network 235 may include any type of network, such as a local area network ("LAN"), a wide area network ("WAN"), a telephone network, e.g., the Public Switched Telephone Network ("PSTN") or a cellular network, an intranet, the Internet, or a combination of networks. Servers 205-220 and clients 225-230 may connect to network 235 via wired and/or wireless connections. In other words, any one of servers 205-220 or clients 225-230 may connect to network 235 via a wired connection, a wireless connection, or a combination of a wired connection and a wireless connection.

Example Client/Server Components

Figure 3:
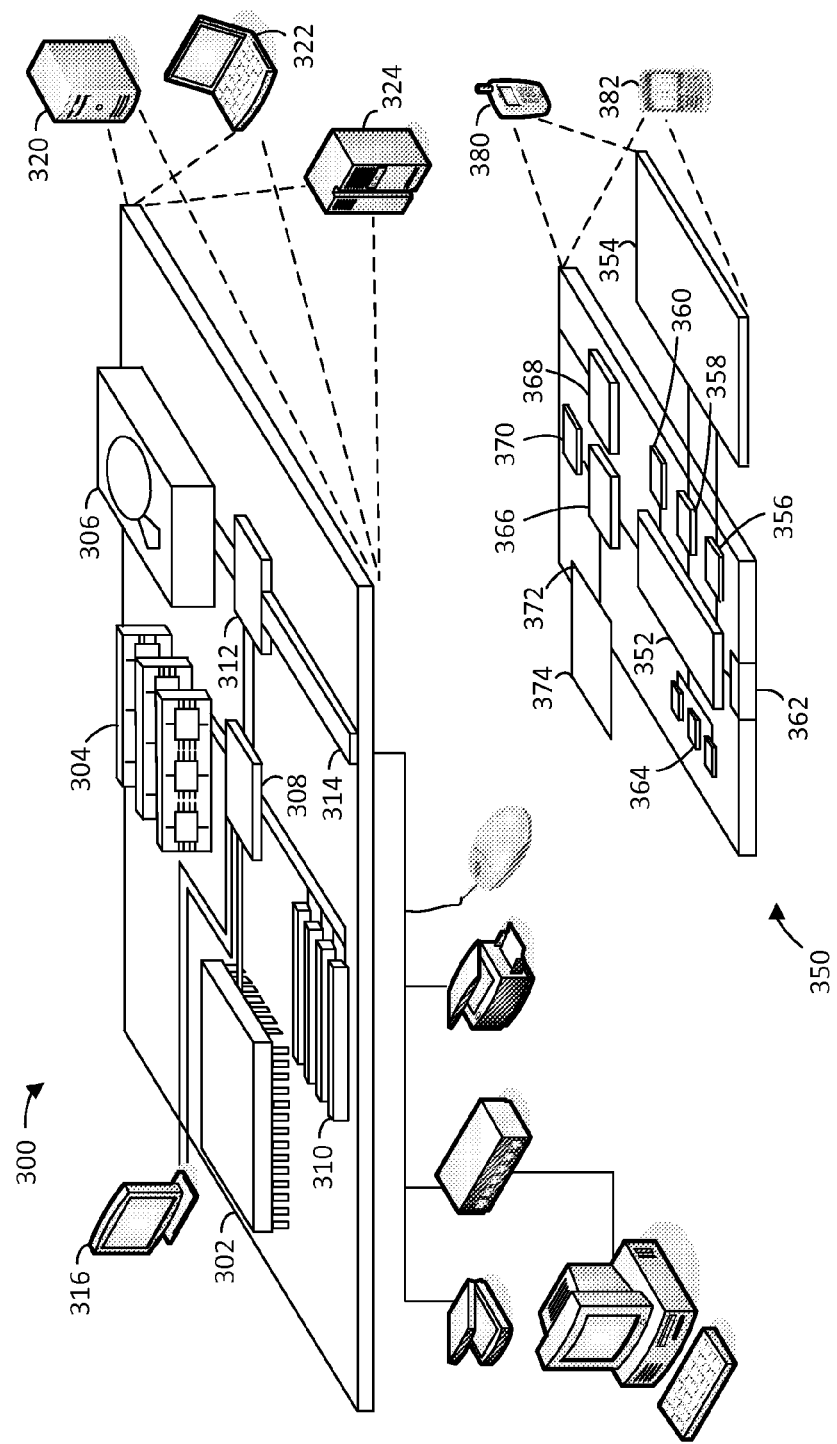
FIG. 3 shows an example of a generic computer device and a generic mobile computer device.

FIG. 3 shows an example of a generic computing device 300 and a generic mobile computing device 350, which may be used with the techniques described here. Generic computing device 300 and generic mobile computing device 350 may correspond to, for example, a client 225/230 and/or a server 205, 210, 215, or 220.

Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown in FIG. 3, their connections and relationships, and their functions, are meant to be examples only, and are not meant to limit implementations of the inventions described and/or claimed in this document.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. Processor 302 can process instructions for execution within the computing device 300, including instructions stored in the memory 304 or on the storage device 306 to display graphical information for a graphical user interface ("GUI") on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations, e.g., as a server bank, a group of blade servers, or a multi-processor system, etc.

Memory 304 stores information within the computing device 300. In one implementation, memory 304 includes a volatile memory unit or units. In another implementation, memory 304 includes a non-volatile memory unit or units. The memory 304 may also be another form of computer-readable medium, such as a magnetic or optical disk.

The storage device 306 is capable of providing mass storage for the computing device 300. In one implementation, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or memory on processor 302.

High speed controller 308 manages bandwidth-intensive operations for the computing device 300, while low speed controller 312 manages lower bandwidth-intensive operations. Such allocation of functions is exemplary only. In one implementation, high-speed controller 308 is coupled to memory 304, display 316, e.g., through a graphics processor or accelerator, and to high-speed expansion ports 310, which may accept various expansion cards (not shown). In this implementation, low-speed controller 312 is coupled to storage device 306 and low-speed expansion port 314. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as mobile computing device 350. Each of such devices may contain one or more of computing devices 300, 350, and an entire system may be made up of multiple computing devices 300, 350 communicating with each other.

Mobile computing device 350 may include a processor 352, memory 364, an input/output ("I/O") device such as a display 354, a communication interface 366, and a transceiver 368, among other components. Mobile computing device 350 may also be provided with a storage device, such as a micro-drive or other device, to provide additional storage. Each of the components 350, 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD (Thin-Film-Transistor Liquid Crystal Display) or an OLED (Organic Light Emitting Diode) display, or other appropriate display technology. Display interface 356 may comprise appropriate circuitry for driving display 354 to present graphical and other information to a user. Control interface 358 may receive commands from a user and convert them for submission to the processor 352. In addition, an external interface 362 may be provide in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a SIMM (Single In Line Memory Module) card interface. Such expansion memory 374 may provide extra storage space for device 350, or may also store applications or other information for mobile computing device 350. Specifically, expansion memory 374 may include instructions to carry out or supplement the processes described above, and may include secure information also. Thus, for example, expansion memory 374 may be provide as a security module for mobile computing device 350, and may be programmed with instructions that permit secure use of device 350. In addition, secure applications may be provided via the SIMM cards, along with additional information, such as placing identifying information on the SIMM card in a non-hackable manner.

Expansion memory 374 may include, for example, flash memory and/or NVRAM memory. In one implementation, a computer program product is tangibly embodied in an information carrier. The computer program product contains instructions that, when executed, perform one or more methods, such as those described above. The information carrier is a computer-or machine-readable medium, such as the memory 364, expansion memory 374, or memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound, e.g., voice messages, music files, etc., and may also include sound generated by applications operating on mobile computing device 350.

Mobile computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" and "computer-readable medium" refers to any non-transitory apparatus and/or device, e.g., magnetic discs, optical disks, memory, Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, e.g., a CRT (cathode ray tube) or LCD (liquid crystal display) monitor) for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a LAN, a WAN, and the Internet.

Example Process for Correlating Documents

Figure 4A:
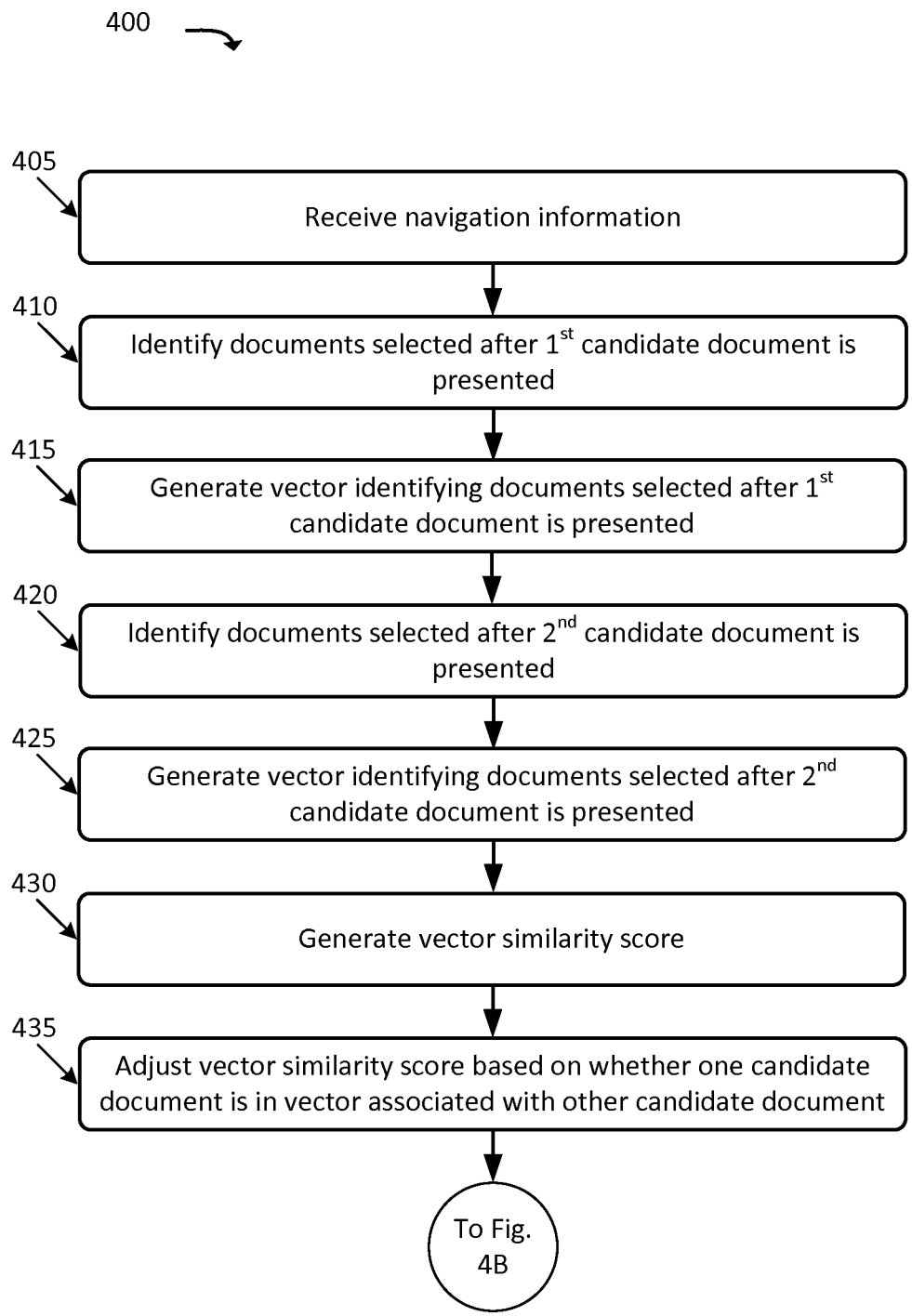
FIGS. 4A-B illustrate a flowchart of an example process for clustering documents.
Figure 4B:
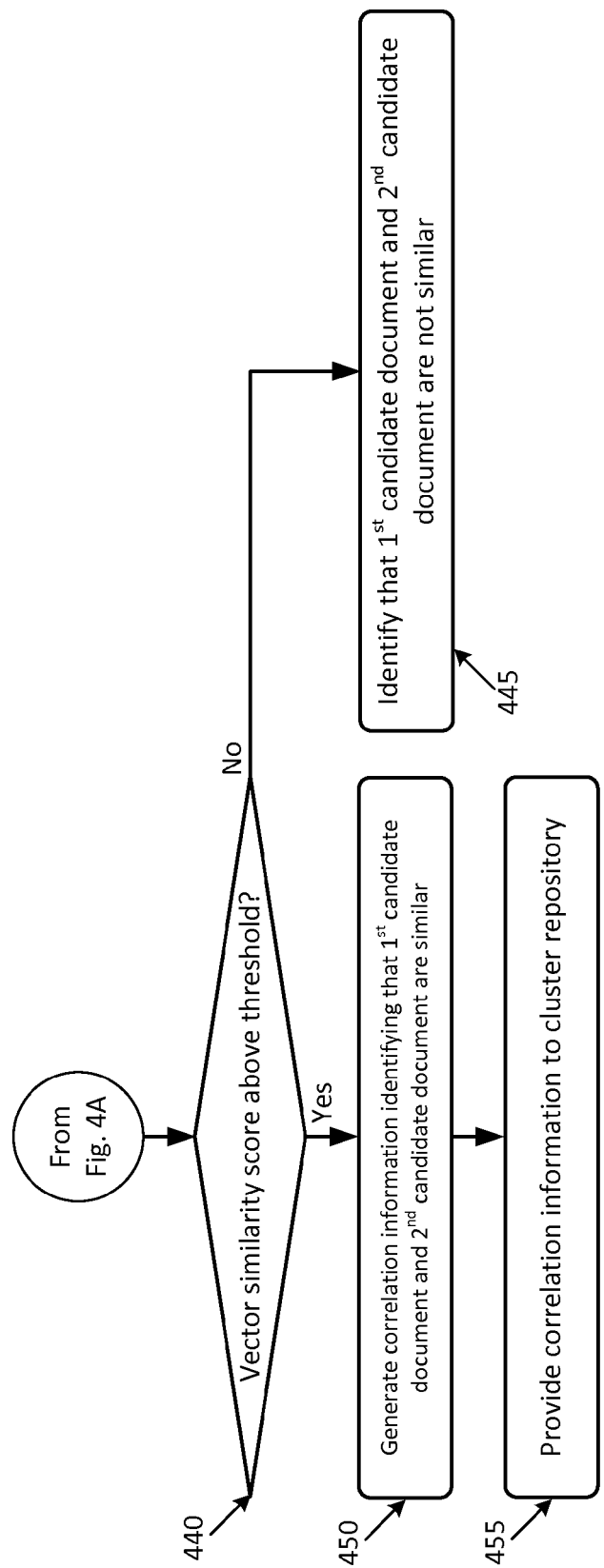
Figure 5:
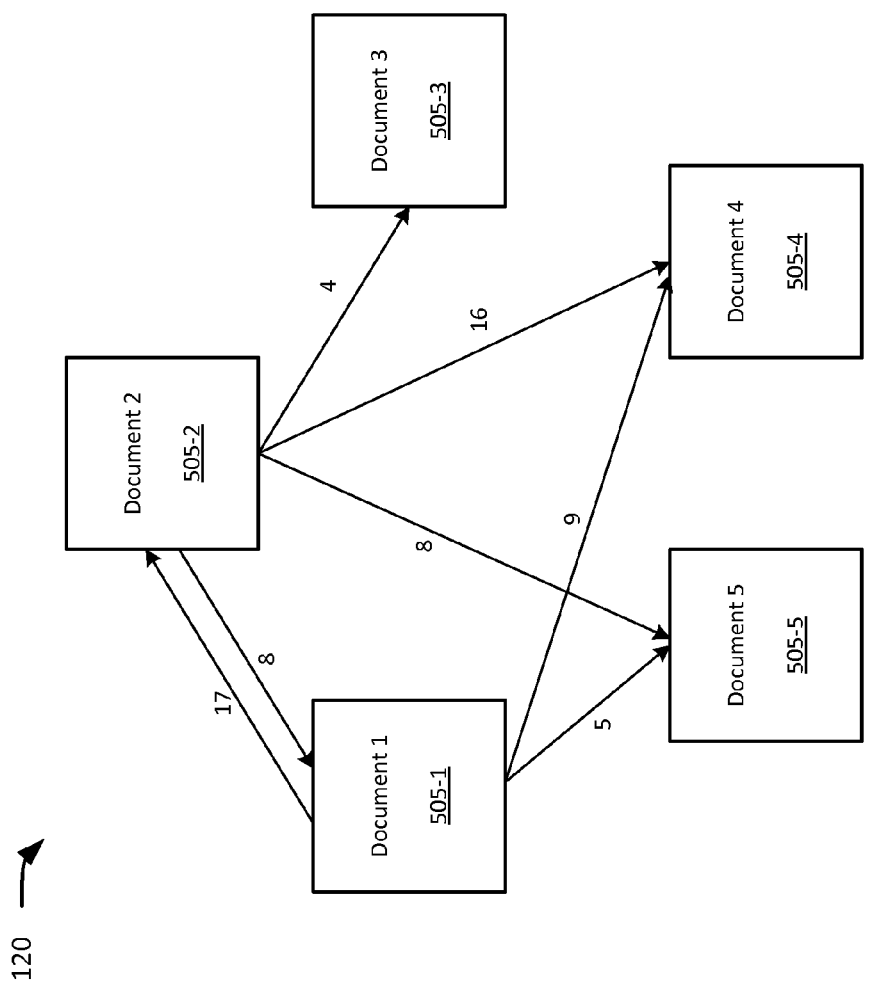
FIG. 5 illustrates an example of navigation information.
Figure 6:
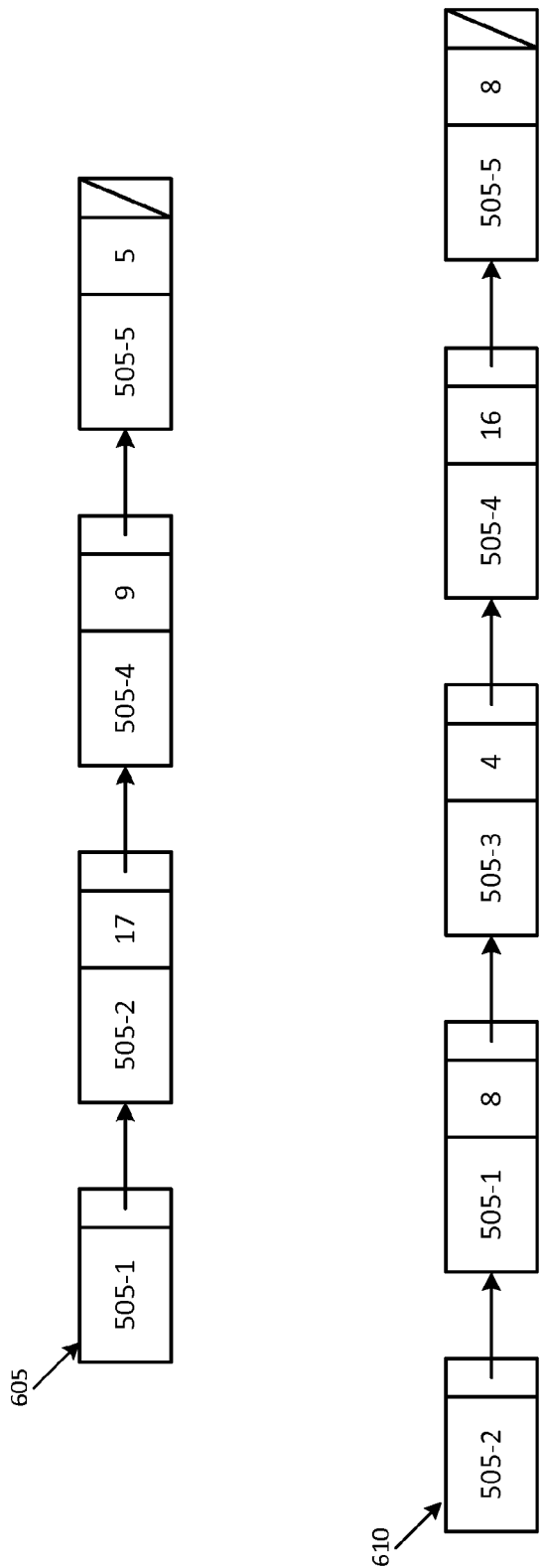
FIG. 6 illustrates example data structures that may represent vectors.
Figure 7:
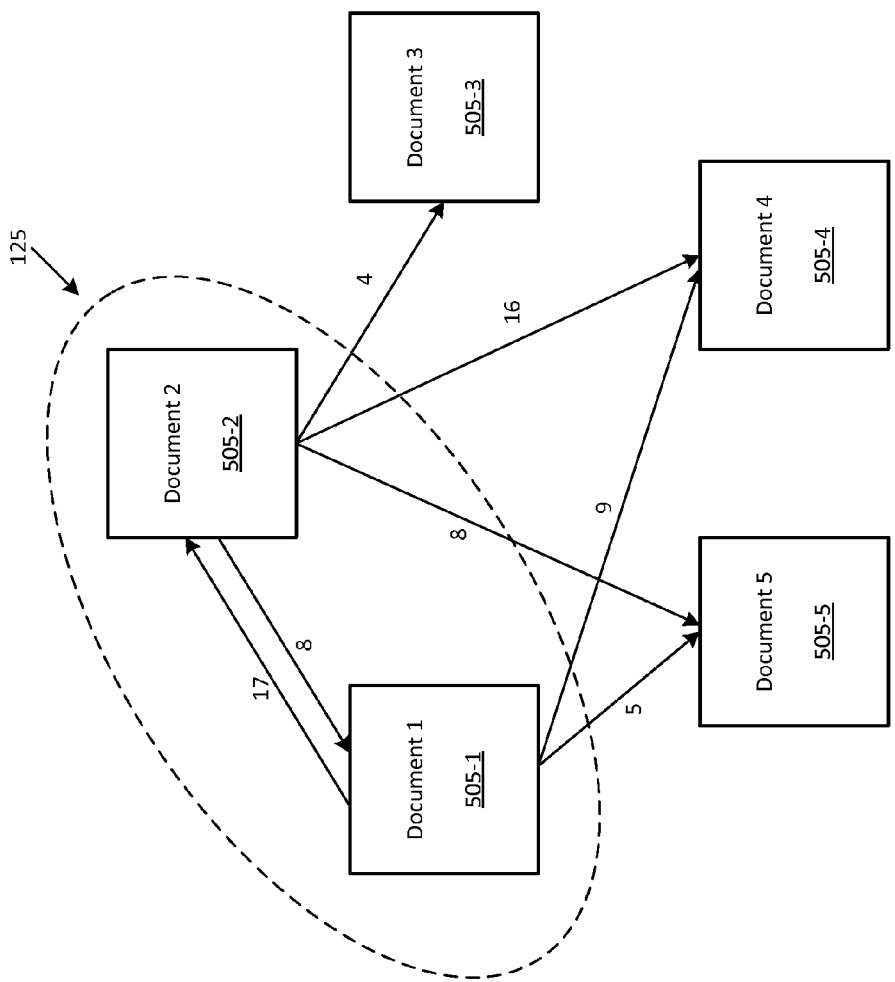
FIG. 7 illustrates an example of identified correlation information.

FIGS. 4A-B, hereinafter collectively referred to as "FIG. 4," illustrate a flowchart of an example process 400 for correlating documents. FIGS. 5-7, which are described below in conjunction with FIG. 4, further serve to illustrate process 400. In one implementation, process 400 may be performed by document correlation server 210. In another implementation, some or all of process 400 may be performed by one or more other components instead of, or possibly in conjunction with, document correlation server 210. For example, some or all of process 400 may be performed by server 220.

As shown in FIG. 4, process 400 may include receiving navigation information (block 405). For example, document correlation server 210 may receive navigation information 120 from log repository server 205. FIG. 5 illustrates example navigation information 120 that may be received from log repository server 205.

As shown in FIG. 5, navigation information 120 may include information regarding a set of documents, e.g., documents 505-1 through 505-5. For example, navigation information 120 may identify navigation, e.g., a click and/or another type of selection, after one document—e.g., a document that includes an image, an image itself, etc. —was presented, to another document—e.g., to another document that includes another image, another image, a link to another image, etc.

Navigation information 120 may include direct and/or indirect navigation. Direct navigation may include, for example, navigation from a first document to a second document, with no intervening documents. Indirect navigation may include, for example, navigation from a first document to a second document, with one or more intervening documents. For example, if a user is presented a first document, then selects a second document, and subsequently selects a third document, navigation information 120 may identify that the second and third documents were selected after the first document was presented.

In the example shown in FIG. 5, navigation information 120 may identify that document 505-2 was selected 17 times after document 505-1 was presented, e.g., directly selected after document 505-1 was presented, indirectly selected after document 505-1 was presented, or some combination of direct and indirect selections, that document 505-5 was selected 5 times after document 505-1 was presented, e.g., directly selected after document 505-1 was presented, indirectly selected after document 505-1 was presented, or some combination of direct and indirect selections, and that document 505-4 was selected 9 times after document 505-1 was presented, e.g., directly selected after document 505-1 was presented, indirectly selected after document 505-1 was presented, or some combination of direct and indirect selections.

In one implementation, navigation information 120 may describe navigation that occurred within a particular session. For example, navigation information 120 may identify that document 505-4 was selected 16 times by users, each selection being made by a particular user in the same particular session that document 505-2 was provided to the particular user. A "session" may be defined in any one of a number of ways. For example, a session may begin when a document is presented/displayed, when a document is identified as a search result to a search query, when a search query is submitted, when a browser window is opened, when a user logs into a server associated with a document correlation, e.g., one or more of servers 205-220, etc. A session may end after expiration of a particular period of time, when another search query is submitted, after a particular quantity of selections are made, e.g., after, for example, 5 selections, it may be inferred that subsequent selections are no longer related to the candidate document, when a browser that displays the document is closed, etc. Furthermore, a session may be defined using any combination of the above examples.

Thus, navigation information 120 may include information spanning numerous sessions. For example, the 16 selections of document 505-4, after document 505-2 was presented, may have occurred during up to 16 different sessions, by up to 16 different users. Additionally, the 9 selections of document 505-4, after document 505-1 was presented, may have occurred in the same sessions as, and/or one or more different sessions from, the sessions during which document 505-4 was selected after document 505-2 was presented.

Returning to FIG. 4, process 400 may further include identifying documents selected after a first candidate document is presented (block 410). For example, document correlation server 210 may identify, based on navigation information 120, documents that were selected after document 505-1 was presented. As shown in FIG. 5, document correlation server 210 may identify that document 505-2 was selected 17 times after document 505-1 was presented, that document 505-5 was selected 5 times after document 505-1 was presented, and that document 505-4 was selected 9 times after document 505-1 was presented.

In one implementation, subsequent selections of other documents may be identified and/or counted when one or more conditions are met. For example, one such condition may include whether the first candidate document was presented as a search result in response to a search query. In such an implementation, if document 505-1 was presented, but not as a search result, e.g., was manually navigated to by a user, was presented as an advertisement, etc., document correlation server 210 may not identify/count selections of other documents that are selected after document 505-1 is presented. In another example, navigation information 120 may further identify whether one or more of the documents, described by navigation information 120, was presented in response to a search query, e.g., navigation information 120 may identify, for each time that a particular document was presented, whether the particular document was presented in response to a search query.

Additionally, or alternatively, document correlation server 210 may identify/count subsequent selections of documents after a particular candidate document is presented, notwithstanding whether the particular candidate document was presented as a search result. For example, if document 505-1 was presented, but not as a search result, e.g., was manually navigated to by a user, was presented as an advertisement, etc., document correlation server 210 may identify/count selections of other documents that are selected after document 505-1 is presented.

When identifying the documents selected after the first candidate document is presented (at block 410), document correlation server 210 may identify/count only documents that were selected within a session during which the first candidate document was presented. As discussed above, a session can be defined in one of numerous ways, e.g., beginning when a candidate document is presented, beginning when a candidate document is returned as a search query result, ending after a particular duration of time has expired since the candidate document was presented, etc. In such an implementation, for example, if document correlation server 210 identifies that document 505-4 was selected 10 times after document 505-1 was presented, but only 9 of those selections were during sessions during which document 505-1 was presented, then document correlation server 210 may identify that document 505-4 was selected 9 times after document 505-1 was presented.

In another implementation, document correlation server 210 may ignore sessions. In such an implementation, and continuing with the example immediately above, document correlation server 210 may identify that document 505-4 was selected 10 times after document 505-1 was presented.

Process 400 may further include generating a vector, e.g., a document vector, identifying documents that were selected after the first candidate document is presented (block 415). For example, document correlation server 210 may generate vector 605, as shown in FIG. 6. Vector 605 may take the form of any data structure, e.g., a matrix, a linked list, an array, a tree, a hash table, etc. As shown in FIG. 6, vector 605 may include an identification of the first candidate document, e.g., document 505-1. Vector 605-1 may also include an entry for each document identified as being selected subsequent to the presentation of document 505-1, e.g., documents that were identified at block 410. As shown in FIG. 6, vector 605 includes an entry for each of document 505-2, document 505-4, and document 505-5. As further shown in FIG. 6, vector 610 may further include information indicating a weight of each entry, e.g., a quantity of selections of a particular document after the first candidate document was presented.

Returning to FIG. 4, process 400 may further include identifying documents selected after a second candidate document is presented (block 420). For example, document correlation server 210 may identify, based on navigation information 120, documents selected after document 505-2 is presented. For example, as shown in FIG. 5, document correlation server 210 may identify that document 505-1 was selected 8 times after document 505-2 was presented, that document 505-3 was selected 4 times after document 505-2 was presented, that document 505-4 was selected 16 times after document 505-2 was presented, and that document 505-5 was selected 8 times after document 505-2 was presented. Similar to the discussion above with respect to block 410, document correlation server 210 may identify subsequent selections of documents within the same session as a session in which the second candidate document was presented. Alternatively, as discussed above with respect to block 410, document correlation server 210 may identify subsequent selections of documents after the second candidate document was presented, while ignoring the concept of sessions.

Process 400 may further include generating a vector identifying the documents selected after the second candidate document is presented (block 425). For example, document correlation server 210 may generate vector 610, as shown in FIG. 6. Vector 610 may take the form of a linked list, or any other data structure. As shown in FIG. 6, vector 610 includes an entry for each of document 505-1, document 505-3, document 505-4, and document 505-5. As further shown in FIG. 6, vector 610 may further include information indicating a weight of each entry, e.g., a quantity of selections of a particular document after the second candidate document was presented.

Returning to FIG. 4, process 400 may further include generating a vector similarity score (block 430). For example, document correlation server 210 may compare vectors 605 and 610 to determine a similarity of vectors 605 and 610. The similarity may be based on how many documents are common between vectors 605 and 610. The similarity may also, or alternatively, be based on weights associated with documents associated with vectors 605 and 610.

For example, document correlation server 210 may determine a cosine similarity of vectors 605 and 610. Additionally, or alternatively, document correlation server 210 may determine the similarity of the vectors in any other way. Document correlation server 210 may, for example, determine a ratio of documents in one of vectors 605/610 that appear in the other of vectors 605/610. In such an example, document correlation server 210 may determine that 100% of the documents associated with vector 605 are associated with vector 610, e.g., information identifying documents 505-4 and 505-5 appears in vector 610, and vector 610 is associated with document 505-2. Additionally, or alternatively, document correlation server 210 may determine that 80% of the documents associated with vector 610 are associated with vector 605, e.g., information identifying documents 505-4 and 505-5 appears in vector 605, information identifying document 505-3 does not appear in vector 605, and vector 610 is associated with document 505-2.

Additionally, or alternatively, document correlation server 210 may determine a proportion, e.g., a ratio, a percentage, etc., of selections, associated with a vector, that are associated the other vector. For example, document correlation server 210 may identify that 100% of selections associated with vector 605 are associated with vector 610; i.e., (17+9+5 selections in common with vector 610)/(17+9+5 total selections in vector 605). Document correlation server 210 may also identify that 32 out of 36 (approximately 88.9%) of selections associated with vector 610 are associated with vector 605; i.e., (8+16+8 selections in common with vector 605)/(8+4+16+8 total selections in vector 610).

While different examples of determining a similarity of vectors, e.g., vectors 605-610, was discussed above, any methodology of determining the similarity of vectors may be employed. Furthermore, any combination of the above-described examples may be employed. When determining the similarity based on the above example methodologies, separate similarity scores may be generated and combined to determine an overall similarity score. For example, a first similarity score of vectors 605 and 610 may be determined based on a cosine similarity score of vectors 605 and 610. A second similarity score of vectors 605 and 610 may be determined based on a proportion of documents that are common between vectors 605 and 610. The first and second similarity scores may be combined, e.g., averaged. Furthermore, when combining the first and second similarity scores, the first and/or the second similarity score may be weighted by a particular amount, e.g., a user-configurable amount. In other words, the first similarity score may be multiplied by a first weight, and/or the second similarity score may be multiplied by a different second weight. For example, the score, that is based on the cosine similarity, may be weighted by X, and the other score, which is based on the proportion of common documents, may be weighted by Y, where X and Y are different numbers.

Process 400 may further include adjusting the vector similarity score based on whether one candidate document is identified in a vector associated with the other candidate document (block 435). For example, document correlation server 210 may identify that document 505-1 is in vector 610, and/or that document 505-2 is in vector 605. Because a direct correlation, e.g., one candidate document was selected after the other candidate document was presented, and/or vice versa, may be a strong indication that the two candidate documents are related, document correlation server 210 may adjust, e.g., increase, the similarity score based on the direct correlation. Document correlation server 210 may adjust the similarity score by an amount that is based on a number and/or proportion of selections to/from one candidate document from/to the other candidate document.

For example, document correlation server 210 may adjust the similarity score of vectors 605 and 610 to reflect that document 505-2 was selected 17 times after document 505-1 was presented, and/or that document 505-1 was selected 8 times after document 505-2 was presented. Additionally, or alternatively, document correlation server 210 may adjust the similarity score of vectors 605 and 610 to reflect that 17 out of 31 (approximately 54.8%) of the selections in vector 605 are selections of document 505-2, with which vector 610 is associated, and/or that 8 out of 36 (approximately 22.2%) of the selections in vector 610 are selections of document 505-1, with which vector 605 is associated.

Additionally, or alternatively, document correlation server 210 may adjust the similarity scores of the vectors by one amount if one document, with which the vectors are associated, appears in the vector for another document, but not vice versa. In such an implementation, document correlation server 210 may adjust the similarity scores of the vectors by another amount if both documents, with which the vectors are associated, appear in each other's vectors.

Process 400 may further include determining whether the vectors' similarity scores are above a threshold (block 440). The threshold may be a threshold that is defined by, for example, an administrator or another user. If the similarity score is not above the threshold (block 440—NO), then document correlation server 210 may identify that the first candidate document and the second candidate document are not similar (block 445).

If, on the other hand, the similarity score is above the threshold (block 440—YES), then document correlation server 210 may generate correlation information identifying the first and second candidate documents as similar (block 450). For example, as shown in FIG. 7, document correlation server 210 may generate correlation information 125 that identifies documents 505-1 and 505-2 as similar.

Process 400 may further include providing the correlation information to a cluster repository (block 455). For example, document correlation server 210 may provide correlation information 125 to cluster repository server 215. Cluster repository server 215 may store correlation information 125, generate new clusters and/or modify, e.g., add information regarding documents 505-1 and 505-2 to, existing clusters based on correlation information 125, etc. Additionally, or alternatively, cluster repository server 215 may provide correlation information to one or more other devices that generate and/or modify clusters. Cluster repository server 215 may receive information that identifies a cluster, based on correlation information 125, from the one or more other devices. Cluster repository server 215 may additionally provide information based on correlation information 125, e.g., clusters generated based on correlation information 125, to search engine server 220, in response to search queries received by search engine server 220.

A search engine, e.g., search engine server 215, may subsequently use correlation information 125, e.g., a cluster generated based on correlation information 125, in an indexing and/or search operation. For example, if search engine server 220 receives a search query, search engine server 220 may identify that the cluster is relevant to the search query, and provide search results, such as one or more documents associated with the cluster.

Additionally, or alternatively, search engine server 220 may use correlation information 125 in a directory listing. For example, a directory, e.g., an index, may include information identifying multiple documents. The documents in the directory may be grouped according to clusters. Thus, documents associated with, for example, a cluster that is based on correlation information 125, may be listed separately from documents associated with one or more other clusters.

Additionally, or alternatively, search engine server 220 may generate a summary of a cluster that is based on correlation information 125. For example, search engine server 220 may analyze documents within the cluster to extract important terms, e.g., terms that appear more frequently than other terms, terms that appear in certain locations of documents, etc. Search engine server 220 may generate a summary document that describes the cluster based on these extracted terms.

Additionally, or alternatively, search engine server 220 may use the cluster for efficient indexing. For example, when indexing documents, search engine server 220 may select only a particular quantity and/or percentage of the documents in the cluster to index. Search engine server 220 may further forego indexing other documents in the cluster.

While process 400 was described as a series of blocks 405-455, some or all of blocks 405-455 may be performed in parallel, when possible. Additionally, some or all of blocks 405-455 may be considered optional. For example, in one implementation, block 435 may be omitted. In such an implementation, the similarity score may not be adjusted based on whether one candidate document is in a vector associated with another candidate document. Additionally, or alternatively, blocks 410-430 may be omitted. In such an implementation, a similarity score may be generated based on whether one candidate document is in a vector associated with another candidate document.

Additionally, or in lieu of block 455, document correlation server 210 may provide correlation information 125 to one or more devices that generate and/or modify clusters. The one or more other devices may generate and/or modify a cluster, and provide the generated/modified cluster to cluster repository server 215. Furthermore, while blocks 410-425 are described above in an example that discusses two candidate documents, blocks 410-425 may be performed in series and/or in parallel on more than two candidate documents.

Further still, process 400 may be performed on candidate documents that have already been identified as related, e.g., candidate documents that are already within the same cluster. When doing so, document correlation server 210 may use a different set of thresholds to determine similarity, e.g., when candidate documents are not in the same cluster, document correlation server 210 may use one set of thresholds to determine similarity, while when documents are in the same cluster, document correlation server 210 may use a different set of thresholds to determine similarity. In another implementation, document correlation server 210 may use the same set of thresholds to determine similarity, regardless of whether the candidate documents are in the same cluster.

By identifying related candidate documents that have already been identified as related, e.g., candidate documents that are within the same cluster, document correlation server 210 may facilitate the creation of clusters within clusters, e.g., sub-clusters that are more specific. For example, candidate documents, which are both within a cluster that relates to Lotus brand automobiles, may both include images of Lotus brand automobiles that are painted red. Document correlation server 210 may identify that the candidate documents are similar, which may facilitate the clustering of these two candidate documents into a more specific sub-cluster, e.g., red Lotus automobiles, within the cluster, e.g., Lotus automobiles.

Figure 8:
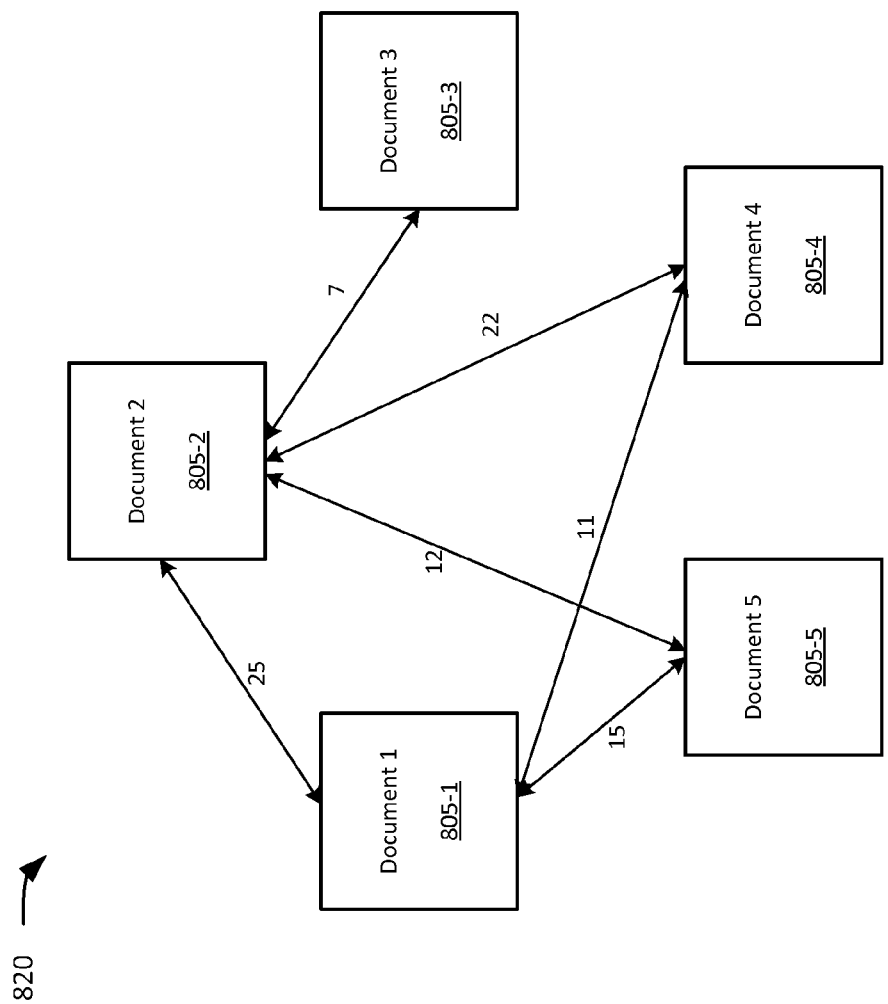
FIG. 8 illustrates another example of navigation information.

While the above-described examples are described in the context of identifying document selections after a particular document is presented, some implementations may correlate documents regardless of whether they were selected and/or presented before the particular document was presented. FIG. 8 illustrates another example of navigation information 120 according to such an implementation. As shown in FIG. 8, navigation information may identify documents that were selected and/or presented in the same session(s) as other documents.

For example, as shown in FIG. 8, navigation information 820 may identify that document 805-1 and document 805-2 were selected and/or presented in the same session 25 times, e.g., document 805-1 was selected and/or presented before document 805-2 was selected and/or presented, and/or document 805-2 was selected and/or presented before document 805-1 was selected and/or presented, that document 805-2 and document 805-3 were selected and/or presented in the same session 7 times, etc. Some or all of process 400 may be performed based on navigation information 820. For example, document correlation server 210 may receive navigation information 820, generate vectors for candidate documents based on documents with which they are correlated, as identified by navigation information 820, generate a vector similarity score, determine whether the vector similarity score is above a threshold, and provide correlation information to a cluster repository.

Conclusion

An implementation, described herein, may identify whether candidate documents are related, based on selections of other documents that are presented after the candidate documents are selected. Identifying related documents may enable clusters and/or sub-clusters to be formed, that include the candidate documents. A search engine my use the clusters and/or sub-clusters in any of a myriad of ways. For example, the search engine may use the clusters and/or sub-clusters to provide groups of search results to a user that are relevant to a search query submitted by the user, generate a categorized directory listing, index only a particular set of documents, generating summary documents of the clusters and/or sub-clusters, etc.

The foregoing description provides illustration and description, but is not intended to be exhaustive or to limit the implementations to the precise form disclosed. Modifications and variations are possible in light of the above teachings or may be acquired from practice of the implementations.

As used herein, the term "component," is intended to be broadly interpreted to refer to hardware, software, or a combination of hardware and software.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by one or more server devices, the method comprising:
    receiving, by at least one of one or more server devices, first navigation information identifying a first set of documents that are selected after a first document is provided,
        the first navigation information identifying a first plurality of documents, of the first set of documents, that are selected,
            each of the first plurality of documents being selected after the first document is provided, and
            each of the first plurality of documents being selected based on information associated with the first document, and
        the first navigation information including information identifying a quantity of selections of the first plurality of documents after the first document is provided;
    receiving, by at least one of the one or more server devices, second navigation information identifying a second set of documents that are selected after a second document is provided,
        the second navigation information identifying a second plurality of documents, of the second set of documents, that are selected,
            each of the second plurality of documents being selected after the second document is provided, and
            each of the second plurality of documents being selected based on information associated with the second document;
    generating, by at least one of the one or more server devices, a first data structure that includes information associating the first document with the first navigation information;
    generating, by at least one of the one or more server devices, a second data structure that includes information associating the second document with the second navigation information;
    comparing, by at least one of the one or more server devices and using the first data structure and the second data structure, the first set of documents to the second set of documents;
    generating, by at least one of the one or more server devices, a similarity score based on the comparing and based on the information identifying the quantity of selections of the first plurality of documents after the first document is provided;
    determining, by at least one of the one or more server devices, based on the similarity score, that the first document is similar to the second document; and
    generating, by at least one of the one or more server devices and based on determining that the first document is similar to the second document, a cluster that includes identification information identifying the first document and the second document.

2. The method of claim 1, where the first navigation information includes:
    information identifying a set of selections of documents in the first set of documents, each selection being made in one of a plurality of sessions during which the first document was provided.

3. The method of claim 2, where a first selection, of the set of selections, is made in a first session during which the first document was provided, and
    where a second selection, of the set of selections, is made in a different second session during which the first document was provided.

4. The method of claim 2, where a particular session, of the plurality of sessions, begins when the first document is provided to a client device from which the selection is received.

5. The method of claim 4, where the particular session ends upon:
    receiving a particular quantity of selections of documents from the client device,
    an expiration of a particular duration of time after the first document is provided to the client device, or
    when a browser, via which the first document is displayed, is closed.

6. The method of claim 2, where a particular session, of the plurality of sessions, begins when:
    the first document is provided to a client device as a search result based on a search query received from the client device, or
    the search query is received from the client device, and where the particular session ends upon receiving another search query from the client device.

7. The method of claim 1, where
    the first data structure is a first vector,
    the second data structure is a second vector, and
    comparing the first set of documents to the second set of documents includes:
        determining a similarity of the first vector and the second vector.

8. The method of claim 7, where determining the similarity of the first vector and the second vector includes:
    determining a cosine similarity of the first vector and the second vector.

9. The method of claim 7, where determining the similarity of the first vector and the second vector includes:
    determining a proportion of documents, of the first set of documents, that appear in the second set of documents.

10. A non-transitory computer-readable medium storing instructions, the instructions comprising:
a set of instructions, which, when executed by one or more processors, cause the one or more processors to:
receive first navigation information identifying a first set of documents that are selected after a first document is provided,
the first navigation information identifying a first plurality of documents, of the first set of documents, that are selected,
each of the first plurality of documents being selected after the first document is provided, and
each of the first plurality of documents being selected based on information associated with the first document, and
the first navigation information including information identifying a quantity of selections of the first plurality of documents after the first document is provided;
receive second navigation information identifying a second set of documents that are selected after a second document is provided,
the second navigation information identifying a second plurality of documents, of the second set of documents, that are selected,
each of the second plurality of documents being selected after the second document is provided, and
each of the second plurality of documents being selected based on information associated with the second document;
generate a first data structure that includes information associating the first document with the first navigation information;
generate a second data structure that includes information associating the second document with the second navigation information;
compare, using the first data structure and the second data structure, the first set of documents to the second set of documents;
generate a similarity score based on the comparing and based on the information identifying the quantity of selections of the first plurality of documents after the first document is provided;
determine, based on the similarity score, that the first document is similar to the second document; and
assign, based on determining that the first document is similar to the second document, the first document and the second document to a cluster,
the cluster including identification information identifying the first document and the second document.

11. The non-transitory computer-readable medium of claim 10, where the first navigation information includes:
information identifying a set of selections of documents in the first set of documents, each selection, of the set of selections, being made in one of a plurality of sessions during which the first document was provided.

12. The non-transitory computer-readable medium of claim 10, where
the first data structure is a first vector, the second data structure is a second vector, and
the instructions to compare the first set of documents to the second set of documents include instructions that cause the one or more processors to:
determine a similarity of the first vector and the second vector.

13. The non-transitory computer-readable medium of claim 12, where the instructions to determine the similarity of the first vector and the second vector include:
instructions to determine a cosine similarity of the first vector and the second vector.

14. A system comprising:
one or more memory devices storing instructions; and
one or more processors to execute the instructions to:
receive first navigation information identifying a first set of documents that are selected after a first document is provided,
the first navigation information further identifying a quantity of times that each document, in the first set of documents, was selected after the first document was provided,
the first navigation information further identifying a first plurality of documents, of the first set of documents, that are selected,
each of the first plurality of documents being selected after the first document is provided, and
each of the first plurality of documents being selected based on information associated with the first document;
receive second navigation information identifying a second set of documents that are selected after a second document is provided,
the second navigation information further identifying a quantity of times that each document, in the second set of documents, was selected after the second document was provided,
the second navigation information further identifying a second plurality of documents, of the second set of documents, that are selected,
each of the second plurality of documents being selected after the second document is provided, and
each of the second plurality of documents being selected based on information associated with the second document;
generate a first data structure that includes information associating the first document with the first navigation information;
generate a second data structure that includes information associating the second document with the second navigation information;
compare, using the first data structure and the second data structure, the first set of documents to the second set of documents, when comparing the first set of documents to the second set of documents, the one or more processors are to:
generate a similarity score based on the comparing, the similarity score being based on at least one of:
the quantity of times each document, in the first set of documents, was selected after the first document was provided, or
the quantity of times each document, in the second set of documents, was selected after the second document was provided;
determine, based on the similarity score, that the first document is similar to the second document; and
generate, based on determining that the first document is similar to the second document, a cluster that includes identification information identifying the first document and the second document.

15. The system of claim 14, where the first navigation includes:

information identifying a set of selections of documents in the first set of documents, each selection being made in one of a plurality of sessions during which the first document was provided.

16. The system of claim 14, where
the first data structure is a first vector,
the second data structure is a second vector, and
when comparing the first set of documents to the second set of documents, the one or more processors are to:
    determine a similarity of the first vector and the second vector.

17. The system of claim 16, where, when determining the similarity of the first vector and the second vector, the one or more processors are to:
    determine a cosine similarity of the first vector and the second vector.

18. The system of claim 14, where, when generating the similarity score, the one or more processors are to:
    weight selections of one or more documents, that were selected after a respective one of the first document or the second document, based on a quantity of times that the one or more documents were selected after the respective one of the first document or the second document.

* * * * *